(12) United States Patent
Bergwerff et al.

(10) Patent No.: US 10,953,389 B2
(45) Date of Patent: Mar. 23, 2021

(54) NICKEL CONTAINING MIXED METAL-OXIDE/CARBON BULK HYDROPROCESSING CATALYSTS AND THEIR APPLICATIONS

(71) Applicant: ALBEMARLE EUROPE SPRL, Louvain-la-Nueve (BE)

(72) Inventors: Jacob Arie Bergwerff, Amsterdam (NL); Wilhelmus Clemens Jozef Veerman, Volendam (NL); Ronald Jan Huiberts, Purmerend (NL); Soňa Eijsbouts-Spičková, Nieuwkuijk (NL)

( * ) Notice: Subject to any disclaimer, the term of this patent is extended or adjusted under 35 U.S.C. 154(b) by 0 days.

(21) Appl. No.: 16/074,628

(22) PCT Filed: Feb. 1, 2017

(86) PCT No.: PCT/EP2017/052122
§ 371 (c)(1),
(2) Date: Aug. 1, 2018

(87) PCT Pub. No.: WO2017/134090
PCT Pub. Date: Aug. 10, 2017

(65) Prior Publication Data
US 2019/0039052 A1    Feb. 7, 2019

Related U.S. Application Data

(60) Provisional application No. 62/289,707, filed on Feb. 1, 2016.

(51) Int. Cl.

| | | |
|---|---|---|
| *B01J 23/888* | (2006.01) | |
| *B01J 27/051* | (2006.01) | |
| *B01J 37/20* | (2006.01) | |
| *B01J 37/00* | (2006.01) | |
| *C10G 45/08* | (2006.01) | |
| *B01J 23/883* | (2006.01) | |
| *B01J 31/22* | (2006.01) | |
| *B01J 35/00* | (2006.01) | |
| *B01J 35/10* | (2006.01) | |
| *B01J 35/02* | (2006.01) | |
| *B01J 37/08* | (2006.01) | |
| *B01J 31/02* | (2006.01) | |
| *B01J 31/04* | (2006.01) | |
| *B01J 31/34* | (2006.01) | |
| *B01J 37/04* | (2006.01) | |
| *B01J 37/02* | (2006.01) | |

(52) U.S. Cl.
CPC ......... *B01J 27/0515* (2013.01); *B01J 23/883* (2013.01); *B01J 23/888* (2013.01); *B01J 23/8885* (2013.01); *B01J 31/0202* (2013.01); *B01J 31/04* (2013.01); *B01J 31/2208* (2013.01); *B01J 31/34* (2013.01); *B01J 35/002* (2013.01); *B01J 35/006* (2013.01); *B01J 35/0013* (2013.01); *B01J 35/02* (2013.01); *B01J 35/1009* (2013.01); *B01J 35/1014* (2013.01); *B01J 37/0009* (2013.01); *B01J 37/04* (2013.01); *B01J 37/084* (2013.01); *B01J 37/20* (2013.01); *C10G 45/08* (2013.01); *B01J 37/0236* (2013.01); *C10G 2300/202* (2013.01)

(58) Field of Classification Search
None
See application file for complete search history.

(56) References Cited

U.S. PATENT DOCUMENTS

| | | |
|---|---|---|
| 4,113,605 A | 9/1978 | Mickelson |
| 6,156,695 A | 12/2000 | Soled et al. |
| 6,566,296 B2 | 5/2003 | Plantenga et al. |
| 7,951,746 B2 | 5/2011 | Bai et al. |
| 8,486,259 B2 | 7/2013 | Eijsbouts-Spickova et al. |
| 2007/0155618 A1 | 7/2007 | Diehl et al. |
| 2009/0107883 A1 | 4/2009 | Maesen et al. |
| 2010/0093522 A1 | 4/2010 | Beeckman et al. |
| 2010/0276338 A1 | 11/2010 | Dykstra et al. |

(Continued)

FOREIGN PATENT DOCUMENTS

| | | |
|---|---|---|
| CN | 104785274 | 3/2017 |
| DE | 3029266 A1 | 2/1981 |

(Continued)

OTHER PUBLICATIONS

International Search Report and Written Opinion of corresponding international application No. PCT/EP2017/052122 dated May 17, 2017, all enclosed pages cited.

International Preliminary Report on Patentability of corresponding international application No. PCT/EP2017/052122 dated Aug. 7, 2018, all enclosed pages cited.

*Primary Examiner* — Tam M Nguyen

(74) *Attorney, Agent, or Firm* — Nathaniel C. Dunn; Marcy M. Hoefling; Troy S. Kleckley

(57) ABSTRACT

The current invention relates a bulk catalyst precursor (i.e. no support material is added as such) comprising Ni and Mo and/or W and an organic component, wherein the molar ratio of C:(Mo+W) ranges from 1.5 to 10. The bulk catalyst precursor is prepared from a mixture of metal-precursors with an organic agent. The organic agent is partly decomposed to form a mixed metal-oxide/C phase which is in effect the bulk catalyst precursor. This bulk catalyst precursor (i) is effectively insoluble in water (ii) does not have any appreciable pore volume or surface area and (iii) does not contain a (nano)crystalline metal-oxide phase as characterized by XRD. A bulk catalyst is made from the bulk catalyst precursor.

10 Claims, 7 Drawing Sheets

(56) References Cited

U.S. PATENT DOCUMENTS

| | | | |
|---|---|---|---|
| 2011/0294657 A1* | 12/2011 | Soled | B01J 37/0203 502/167 |
| 2013/0261362 A1 | 10/2013 | Fingland et al. | |
| 2013/0313165 A1* | 11/2013 | Kim | B01J 23/755 208/243 |
| 2014/0374319 A1* | 12/2014 | Soled | C10G 45/08 208/215 |
| 2015/0038751 A1* | 2/2015 | Ng | B01J 29/166 585/313 |

FOREIGN PATENT DOCUMENTS

| | | | |
|---|---|---|---|
| EA | 022003 | B1 | 10/2015 |
| EP | 1299186 | B1 | 5/2008 |
| RU | 2342995 | C2 | 1/2009 |
| WO | 1999003578 | A1 | 1/1999 |
| WO | 2000041810 | A1 | 7/2000 |
| WO | 2007048593 | A1 | 5/2007 |
| WO | 2007048598 | A2 | 5/2007 |
| WO | 2007048600 | A2 | 5/2007 |
| WO | 2007050634 | A2 | 5/2007 |
| WO | 2007050635 | A2 | 5/2007 |
| WO | 2007050636 | A2 | 5/2007 |
| WO | 2008045550 | A1 | 4/2008 |
| WO | 2008045551 | A2 | 4/2008 |
| WO | 2008045552 | A2 | 4/2008 |
| WO | 2008079178 | A1 | 7/2008 |
| WO | 2009-073785 | A1 | 11/2009 |
| WO | 2012130728 | A1 | 10/2012 |

\* cited by examiner

NICKEL CONTAINING MIXED METAL-OXIDE/CARBON BULK HYDROPROCESSING CATALYSTS AND THEIR APPLICATIONS

FIELD OF THE INVENTION

This invention generally relates to a nickel containing bulk catalyst for hydroprocessing. The catalysts are prepared by a method wherein reagents containing Group VIII and Group VIB metals, such as metal salts are mixed with at least one organic acid, polyol or sugar. The resulting mixture is heat treated and then sulfided. The catalysts can be used for hydroprocessing, particularly hydrodesulfurization and hydrodenitrogenation, of hydrocarbon feedstocks.

BACKGROUND OF THE INVENTION

The hydroprocessing of hydrocarbon feedstocks generally encompasses all processes in which a hydrocarbon feedstock is reacted with hydrogen in the presence of a catalyst and under hydroprocessing conditions, typically, at elevated temperature and elevated pressure. The term hydroprocessing includes, but is not limited to, processes such as hydrogenation, hydrodesulfurization, hydrodenitrogenation, hydrodemetallization, hydrodearomatization, hydrodeoxygenation, hydroisomerization, hydrodewaxing, hydrocracking and mild hydrocracking.

In general, conventional hydroprocessing catalysts are composed of a carrier (or support) with a Group VIB metal component and a Group VIII non-noble metal component deposited thereon. Such catalysts may be prepared by impregnating a carrier with aqueous solutions of compounds of the desired metals, followed by one or more drying and/or calcination steps.

Alternative techniques for the preparation of the "supported" catalysts are described in U.S. Pat. No. 4,113,605—where inter alia nickel carbonate is reacted with $MoO_3$ to form crystalline nickel molybdate, which is subsequently mixed and extruded with alumina—and in German Patent No. DE 3029266, where nickel carbonate is mixed with $WO_3$ and the resulting composition is mixed with alumina impregnated with compounds such as nickel nitrate and ammonium tungstate.

A significant amount of attention has recently been directed to the provision of catalysts, which can be applied without a carrier, generally referred to as bulk catalysts. WO 99/03578 describes a method for the preparation of bulk hydroprocessing catalysts compositions comprising bulk metal oxide particles having one Group VIII non-noble metal and two Group VIB metals by reacting and co-precipitating nickel, molybdenum, and tungsten compounds in the absence of sulfides.

WO 00/41810 describes a method for the preparation of a hydroprocessing catalyst comprising bulk metal oxide particles wherein one or more Group VIII non-noble metal and two or more Group VIB metals are reacted in a protic liquid, wherein the metal compounds are at least partly in the solid state during the reaction and where eventually a solid comprising a (nano)crystalline mixed metal oxide phase characterized by a specific XRD pattern is obtained. It also discloses producing the hydroprocessing catalyst in a convenient form for use in a hydroprocessing process by shaping, for example by extrusion, and by compositing the obtained bulk metal oxide particles with small quantities of further materials, for example binder material, to facilitate shaping and to provide mechanical strength to a shaped catalyst.

U.S. Pat. No. 7,951,746 patent describes a method of preparation of an amorphous bulk catalyst precursor and eventual catalyst comprising (i) cobalt and molybdenum or tungsten (ii) an amorphous precursor (iii) having 20-60 wt % of a carbon containing compound based on an organic complexing acid and (iv) having a surface area of 16 $m^2/g$ or less.

U.S. Pat. No. 6,566,296 claims a process for preparing a catalyst composition by combining a group VIII non-noble metal component and a least two group VIB metal components and an organic additive at any stage in the preparation. The molar ratio of the organic additive to the total amount of group VIII and group VIB components is at least 0.01. Examples describe the preparation of a NiMoW oxidic catalyst with di-ethyleneglycol added during the shaping of the catalyst or by post-impregnation. Again, a solid catalyst is obtained comprising a (nano)crystalline mixed metal oxide phase as characterized by the presence of specific peaks in its XRD pattern.

Although the bulk catalyst compositions described above have an excellent hydroprocessing activity, there exists a continuous need in the art to develop novel bulk catalyst compositions with further improved hydroprocessing activity, in particular, in hydrodesulfurisation (HDS), as well as hydrodenitrogenation (HDN), and hydrogenation of particular target hydrocarbon feedstocks, such as diesel and vacuum gas oil (VGO).

SUMMARY OF THE INVENTION

Accordingly, one aspect of the current invention is a bulk catalyst precursor (i.e. no support material is added as such) comprising Ni and Mo and/or W and an organic component, wherein the molar ratio of C:(Mo+W) ranges from 1.5 to 10. The bulk catalyst precursor is prepared from a mixture of metal-precursors with an organic agent. The organic agent is partly decomposed to form a mixed metal-oxide/C phase which is in effect the bulk catalyst precursor. This bulk catalyst precursor (i) is effectively insoluble in water (ii) does not have any appreciable pore volume or surface area and (iii) does not contain a (nano)crystalline metal-oxide phase as characterized by XRD. A bulk catalyst is made from the bulk catalyst precursor. After conventional liquid phase sulfidation, the active sufidic bulk catalyst is formed which has a very high activity in different hydroprocessing applications. After sulfidation of the oxidic catalyst, it is possible that the sulfidic catalyst (i) shows surface area as measured via $N_2$ physisorption and hexane adsorption (ii) loses some of its C during sulfidation.

In one embodiment it is disclosed a bulk catalyst precursor composition comprising Nickel, Molybdenum and/or Tungsten, and an organic component, wherein the amount of molybdenum oxide plus tungsten oxide is at least 30 wt %, wherein the molar ratio of C:(Mo+W) ranges from 1.5 to 10. The ratio of Ni:(Mo+W) is at least 0.05.

In another embodiment, a bulk catalyst is provided that is obtained by shaping the bulk catalyst precursor by any method known in the art, such as extrusion, pelletizing, and/or beading. The bulk catalyst is characterized by a minimum metal loading of 2.0 moles of molybdenum plus tungsten per liter reactor, wherein the molar ratio of nickel to molybdenum plus tungsten is higher than 0.05 and the molar ratio of carbon to molybdenum plus tungsten is between 1.5 and 10. The $MoO_3+WO_3$ loading of this bulk catalyst is higher than what is typically applied in supported hydroprocessing catalysts. In another embodiment, a sulfided catalyst is provided that is formed by sulfiding the above bulk catalyst composition.

In another embodiment, the method for preparing a bulk catalyst precursor is disclosed. The method includes combining at least one Ni compound and at least one Group VIB metal compound with at least one organic agent, thereby forming a solution. The solution is then evaporated and dried. The drying can be carried out by using commonly available drying methods such as spray-drying, freeze drying, or plate drying, etc. The dried material is then subjected to a further heat treatment at about 300° C. to about 500° C. to form a bulk catalyst precursor, which can be shaped by any method known in the art to obtain a bulk catalyst. The bulk catalyst is then sulfided under sulfiding conditions to produce a sulfided catalyst.

In another embodiment, a method for hydroprocessing a hydrocarbon feedstock is provided. The method includes contacting said feedstock with a sulfided bulk catalyst, the sulfided bulk catalyst formed by sulfiding the bulk catalyst as described above.

In accordance with another aspect of the invention there is provided a process for the hydroprocessing of a hydrocarbon feedstock wherein the feedstock is contacted under hydroprocessing conditions with the aforementioned bulk catalyst composition. The bulk catalyst composition according to this invention can be used in virtually all hydroprocessing processes to treat a plurality of feedstocks under wide-ranging reaction conditions, including but not limited to pre-treating a feedstock prior to it being hydrocracked, pre-treating a feedstock prior to it being catalytically cracked or treating a feedstock to generate a transportation fuel with a specific maximum sulphur concentration. Generally, these reaction conditions comprise a temperature in the range from about 200° to about 450° C., hydrogen pressures in the range from about 5 to about 300 Bar, liquid hourly space velocities (LHSV) in the range from about 0.1 to about 10 h$^{-1}$ and H$_2$/oil ratios in the range from about 50 to about 2000 Nl/l. However, it is preferred to employ the catalyst of the present invention in the hydroprocessing of, and more particularly, the hydrodesulfurisation (HDS), hydrodenitrogenation (HDN) and hydrodearomatization (HDA) of feedstocks comprising a diesel oil or a vacuum gas oil under conditions at least comprising liquid hourly space velocities (LHSV) in the range from about 0.1 to about 10 h$^{-1}$ and H$_2$/oil ratios in the range from about 50 to about 2000 Nl/l. The bulk catalyst precursor composition has been found to show improved hydrodesulfurisation activity in applications ranging from 30 to 80 bar in treating a host of different Distillate feed streams. It is fully expected that the bulk catalyst precursor of the invention will have advantages in other hydroprocessing application such as the treatment of VGO fractions and in a broader pressure range as well.

DETAILED DESCRIPTION OF THE INVENTION

Figure 1:
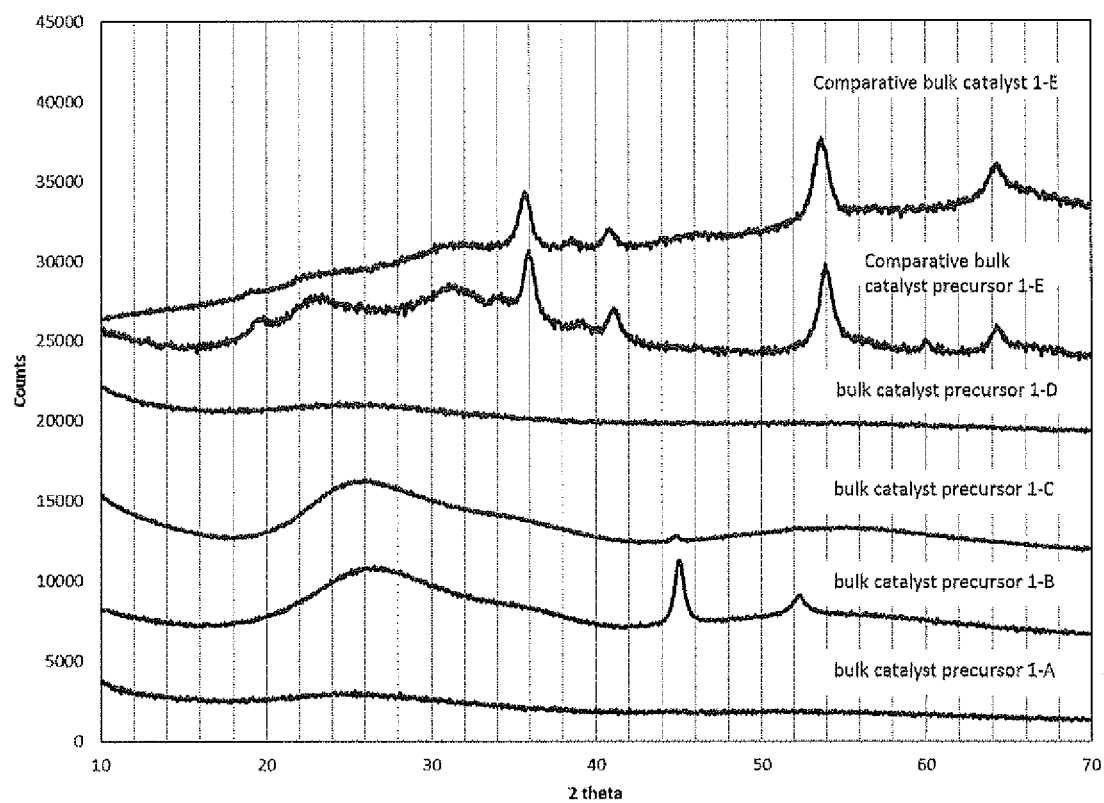
FIG. 1 XRD patterns of bulk catalyst precursors 1-A to 1-D according to the invention, Comparative bulk catalyst precursor 1-E and Comparative bulk catalyst 1-E.

It has been found that a bulk catalyst precursor (i.e. no support material is added as such) comprising Ni and Mo and/or W and an organic phase, wherein the molar ratio of C:(Mo+W) is between 1.5 and 10, which (i) is effectively insoluble in water (ii) does not have any appreciable pore volume or surface area and (iii) does not exhibit the presence of a (nano)crystalline metal-oxide phase as evidenced by XRD have many advantages over corresponding bulk catalysts prepared differently.

The preparation method described in this patent differs from the one used for the bulk catalysts in the prior art. The bulk catalyst precursor is prepared via drying of a NiW, a NiMo or NiMoW solution containing an organic agent followed by decomposition at high T resulting in a mostly amorphous NiMo/W—C phase, which constitutes the bulk catalyst precursor. The bulk catalyst precursors of the invention are characterized by the absence of a crystalline metal-oxide phase. As can be derived from the prior art, a (nano)crystalline metal-oxide phase is generally observed in bulk catalyst precursors, as evident from the presence of specific peaks in the XRD patterns of these materials.

The absence of a support material in bulk catalysts makes that it is extremely difficult to keep the metal oxide phase well-dispersed in this type of system. During precipitation or heat treatment processes, (nano)crystalline metal-oxide phases are therefore generally formed. Despite the high concentration of metal-oxides in the bulk catalyst precursors of the invention, such a crystalline phase is surprisingly absent. It can be envisaged that in the bulk catalysts precursors of the invention, the carbonaceous phase that remains after the thermal treatment acts as a dispersing agent for the metal-oxide phase, resulting in the prevention of the formation of a crystalline metal-oxide phase.

Without wanting to be bound to any theory, it can be speculated that the absence of any crystalline metal-oxide phases in the oxidic catalyst precursor are indicative of a good dispersion of the metal-oxide phase, resulting in a catalyst with a high amount of active sites when the oxidic phase is converted to the active metal-sulfides. Higher activity is observed for the newly invented catalyst versus the catalyst prepared via the methods of the prior art discussed in this case.

The solid catalyst precursor is obtained by evaporation to dryness of a solution containing metal-precursors. This allows for complete flexibility in the catalyst composition: most if not all metal precursors that are present in the solution end up in the bulk catalyst precursor. In precipitation of a certain metal-oxide phase, which is generally done in preparation of other bulk catalysts known in the prior art, on the other hand, the composition is defined by the stoichiometry of that insoluble phase. For example, the Ni:(Mo+W) ratio of the catalyst can be readily adjusted in the catalysts of the invention. In general a Ni:(Mo+W) ratio between 0.20 and 0.75 is applied in hydroporcessing applications, as the amount of Ni is sufficient for the formation of MoS$_2$ and/or WS$_2$ crystallites that are completely decorated with Ni-atoms that act as a promotor of the active phase. However, in some cases a lower ratio may be preferred as this results in lower costs. A higher Ni:(Mo+W) ratio than 0.75 would generally result in the formation of a separate Ni-sulfide phase in the final catalyst, which is applied in certain cases where the functionality of the Ni-sulfide phases is desired.

Avoiding a precipitation process removes the need to deal with a metal-contaminated solvent after filtration. For commercial production of catalysts, this is not a trivial advantage.

It was found that for bulk catalysts prepared with the process described below, formation of metallic Ni-crystals can be observed in the mixed metal-oxide/C phase that forms the bulk catalyst precursor upon heat treatment using X-ray Diffraction (XRD) or transmission electron microscopy (TEM). Characteristic peaks of Ni(0) may be observed in the XRD pattern of the bulk catalyst precursor at 45° and 52° 2 theta which are indicative of the presence of metallic Ni(0) crystals. It cannot be excluded that C is present, dissolved in the Ni lattice, as the formation of such a NiC$_x$ phase does not result in a markedly different XRD pattern. For sake of simplicity, in the following, the Ni(0) or NiC$_x$ crystals will be referred to as Ni-crystals. As a result of the formation of Ni-crystals in the bulk catalyst precursor, Ni-sulfide crystals will be present in the sulfided catalyst. These Ni-crystals are formed under the conditions that are present during heat treatment at a temperature >350° C. as a step in the preparation of the catalyst precursor. The decomposition of the organics during heat treatment results in a reductive environment, which together with the temperature leads to the reduction of the Ni-oxide phase and the formation of the Ni-crystals. Although the resulting bulk catalyst precursor does not contain any crystalline metal-oxide phase, it may therefore not be completely amorphous. In the XRD pattern of bulk catalyst precursors of the invention calcined at a temperature >350° C., the presence of a peak at 45° 2 theta can be observed that can be attributed to the presence of Ni-crystals. A distinguishing feature of this type of catalysts is that when the Ni-crystals are formed, their particle size distribution is very well-defined and the crystals are homogeneously distributed throughout the catalyst precursor phase, as can be observed with electron microscopy. The characteristic high dispersion of the Ni-crystals indicates that the carbon matrix that is formed is an effective dispersing agent for the active phase. In the same way as the Ni-crystals are kept separated during catalyst preparation, the mixed Ni(Mo/W)-sulfide crystallites in the active catalyst are envisaged to remain well dispersed as well.

At the same time, the NiMo, NiMoW and NiW composition results in an improved activity even in conditions where normally CoMo-catalysts are being applied. It is shown that this type of catalyst can also be made by using a polyol or sugar instead of a complexing acid.

The various embodiments relating to these findings are described below in further detail.

Preparation of the Bulk Catalyst Precursor and Bulk Catalyst

The general process involves the following steps. First, intimate mixing of organic agents and metal precursors. Ideally metal-organic complexes are being formed, but this is not required. In practice this is achieved by making a solution of metal-precursors and the organic compounds. The preferred solvent is water. Second, removal of the solvent that is used in step 1. This can be done via thermal drying in a static oven, by spray-drying or in any other device, but also via freeze drying or vacuum drying. Third, partial decomposition of the metal-organic phase to form the mixed metal-oxide/carbon phase which constitutes the bulk catalyst precursor. This is brought about by a thermal treatment, in practice under inert atmosphere (e.g. nitrogen or steam), but air may also be used as long as complete combustion of the organics is prevented. During this treatment the C:O and C:H ratio of the organic phase will increase and the material will become more carbonaceous. This could also be brought about by a chemical reaction, i.e. treatment with e.g. sulphuric acid. Fourth, shaping of the catalyst precursor to obtain the bulk catalyst. This can be done via extrusion, pelletizing, beading, compacting or any other suitable method known in the art. Fifth, sulfidation of the bulk catalyst to form the sulfidic bulk catalyst. This can be done in-situ in the reactor or ex-situ by any known method. While the above lays out the preferred order, other orders of carrying out the process are envisioned. For example, you can shape the precursor prior to decomposition and you can also carry out sulfidation prior to shaping.

The first step of the process is to create a solution containing the Group VIII metal, Group VIB metal, and organic agent. It is preferred that both the Group VIII compound and the Group VIB compound are added in an appropriate predetermined concentration to yield the desired molar ratios. It is desired to have a molar ratio of Ni:(Mo+W) that can vary from 0.05 to 1.05. It is more preferable to have a Ni:(Mo+W) ratio of 0.10-1.05, in particular, while a Ni:(Mo+W) of 0.20-0.75 is most preferred. Group VIII and Group VIB metal reagents and organic agent are mixed with a protic liquid. The mixture is then often heated and constantly stirred for about 1 hour until a clear solution is created. The heating step is only necessary when a reaction of the metal precursors is required to allow for their dissolution. Although it is desired to form a clear solution in which all components are completely dissolved for the sake of having an optimal homogeneity throughout the catalyst, the presence of a small amount of unreacted starting materials or a precipitate that is formed after reaction of the starting materials can still be acceptable.

The preferred Group VIII metal is Ni. The preferred Group VIB metals are Mo and W. Non-limiting examples of suitable Ni precursor compounds include carbonates and acetates and mixtures thereof, including, nickel carbonate, nickel hydroxy carbonate, nickel acetate, nickel citrate, nickel hydroxides, nickel oxide, nickel nitrate, nickel sulphate and mixtures thereof. Preferred molybdenum and tungsten precursor compounds include Molybdenum oxide, molybdic acid, ammonium molybdates, phosphomolybdates, silicomolybdates, Moacetylacetonates, Na-molybdates, Tungstic acid, ammonium tungstates, phosphotungstates, silicotungstates, Na-tungstates, and mixtures thereof.

The organics that can be used in the preparation are carbohydrates (molecules, not necessarily of biological origin that at least contain C, H and O). The organics can be a mixture of different molecules. The wt % C in the total of organic molecules is typically lower than about 50%. The organic molecules contain at least 2 oxygen atoms. The organic molecules can be introduced as separate compounds but may also be introduced via the counterion of the metal-salts. Non-limiting examples of organic additives or agents suitable for use herein include Acetic acid, Aspartic acid, Citric acid, Formic acid, Fumaric acid, Gluconic acid, Glutamic acid, Glyoxylic acid, Ketoglutaric acid, Maleic acid, Malic acid, Oxaloacetic acid, Propionic acid, Pyruvic acid, Succinic acid, Fructose, Glucose, Lactose, Saccharose, Sorbitol, Xylitol, Serine and mixtures thereof. In any event, the organic additive is added in an amount that results in a molar ratio of C:(Mo+W) of between 1.5 and 10 in the bulk catalyst precursor.

The solvent can be any solvent which does not interfere with the reactions of the metal compounds. Examples of solvents include protic liquids such as water, and alcohols such as methanol, ethanol or mixtures thereof. Preferred protic liquids are mixtures of water and other protic liquids, such as mixtures of an alcohol and water, and a more preferred protic liquid is water alone.

It will be evident that different protic liquids can be applied simultaneously in the process. For instance, it is possible to add a suspension of a metal compound in ethanol to an aqueous solution of another metal compound. In some cases, a metal compound can be used which dissolves in its own water of crystallization. The water of crystallization serves as protic liquid in this case.

The second step in the process for preparing the catalysts is a drying step. The drying step is used to remove water, or any other solvent that is used in the preparation of the initial solution, from the mixture. In the drying step, decomposition of the organic agent generally does not take place. It is within the scope of this invention that the heating and/or drying can be performed in multiple steps according to a heating profile. The heating or drying step can be performed by any known method in the art. In particular, the drying step can be carried out by convective drying using hot gas, for instance in a tray dryer or by spray-drying. Alternatively, drying can be done by contact drying, for instance using a rotating disc dryer, paddle dryer or a scraped heat exchanger. Drying via micro-wave heating, freeze-drying or vacuum drying are other options. Spray-drying typically is carried out at an outlet temperature in the range of about 100° to about 200° C. and preferably about 120° to about 180° C.

The third step in the process for preparing the catalysts is partial decomposition of the metal-organic phase. The dried catalyst precursor is subjected to a further heating stage or calcination step. This additional heating stage can be carried out at a temperature from about 300° C. to about 500° C. for an effective amount of time. This effective amount of time will range from about 1 second to about 24 hours, preferably from about 1 minute to about 5 hours. The heating (including possible decomposition) can be carried out in the presence of a flowing oxygen-containing gas such as air, a flowing inert gas such as nitrogen, or a combination of oxygen-containing and inert gases. The time, temperature and conditions for this step are selected such that there is only partial decomposition of the organic additive. A significant amount of carbon is still present after the heat treatment step and the C:(Mo+W) atomic ratio in the bulk catalyst precursor is at least 1.5. The C:O and C:H ratio of the organic phase formed after the decomposition step is generally lower than that of the organic agent added in the first step. In general, it is found that a higher temperature results in a lower activity of the catalyst. Nevertheless, it can be preferred to carry out the calcination at a higher T because the obtained carbonaceous phase formed at higher temperature is more refractory, has a higher C:O and C:H ratio and is more stable under hydroprocessing conditions. As explained, Ni-crystals may be formed during this step in the preparation. Besides metal-oxides and an ill-defined organic phase, metallic Ni-crystals may be present after the thermal treatment. Nevertheless, the material that is formed after the partial decomposition step will be referred to as a mixed metal oxide/C phase. In practice, the drying and decomposition steps may be carried out in a single process step.

After this step, the bulk catalyst precursor is obtained which typically has the following compositional properties:
$MoO_3+WO_3$ wt % between 30-85 wt %
Ni:(Mo+W) molar ratio higher than 0.05
A molar ratio of C:(Mo+W) between 1.5 and 10.
A BET-SA as measured by $N_2$ physisorption of <40 m$^2$/g The fourth step in the process for preparing the catalysts is a shaping step. A bulk catalyst precursor composition, obtained after heating, can be directly formed into shapes suitable for a desired catalytic end use to yield the bulk catalyst. Shaping can also occur prior to the second heating/calcination step. Shaping comprises extrusion, pelletizing, beading and/or spray-drying. It must be noted that if the bulk catalyst composition is to be applied in slurry-type reactors, fluidized beds, moving beds, or expanded beds, generally spray-drying or beading is applied. For fixed bed or ebullating bed applications, generally the bulk catalyst composition is extruded, pelletized and/or beaded. In the case of extrusion, pelletization or beading, at any stage prior to or during the shaping step, any additives which are conventionally used to facilitate shaping can be added. These additives may comprise aluminium stearate, surfactants, graphite, starch, methyl cellulose, bentonite, attapulgite, polyethylene glycols, polyethylene oxides, or mixtures thereof.

To prepare bulk catalyst extrudates, the bulk catalyst precursor can be mixed with an inorganic additive and water and extruded in the presence of an organic extrusion aid. The binder materials to be applied may be any materials conventionally applied as binders in hydroprocessing catalysts. Examples are silica, silica-alumina, such as conventional silica-alumina, silica-coated alumina and alumina-coated silica, aluminas such as (pseudo)boehmite, or gibbsite, titania, titania-coated alumina, zirconia, cationic clays or anionic clays such as saponite, bentonite, attapulgite, kaolin, sepiolite or hydrotalcite, or mixtures thereof. Preferred binders are silica, silica-alumina, alumina, titania, titania-coated alumina, zirconia, bentonite, attapulgite, or mixtures thereof. These binders may be applied as such or after peptization. In some cases the bulk catalyst precursor is milled to obtain a smaller particle size which helps to achieve higher compacted bulk density (CBD) in a fixed bed reactor. This could be beneficial to obtain high metal loadings per reactor volume and it could also increase the strength of the compacted particles. The resulting extrudates are dried at 120° C. or subjected to a further heat treatment at a temperature lower than the temperatures used during the step 2 (the drying step) in the preparation.

Binder materials may already be added during or after step 1 (the preparation of the solution) or step 2 (the drying step) in the preparation. This may be preferred to enable a better distribution of the binder materials throughout the catalyst extrudates. It is understood that these binder materials are not considered to be part of the bulk catalysts precursor, as they are solely added to provide integrity and strength to the catalyst and do not contribute to the activity of the catalyst.

The shaped material that is obtained after step 4 is referred to as the bulk catalyst characterized by:
Ni:(Mo+W) molar ratio higher than 0.05
A molar ratio of C:(Mo+W) between 1.5 and 10.
A minimum metal loading of 2.0 moles (Mo+W)/liter reactor volume The process optionally may comprise a sulfidation step (step 5). Sulfidation generally is carried out by contacting the bulk catalyst precursor, directly after its preparation or after any one of process steps, with a sulfur-containing compound such as elementary sulfur, hydrogen sulfide, dimethyl disulfide (DMDS), or organic or inorganic polysulfides. The sulfidation step can be carried out in the liquid and the gas phase. The sulfidation can be carried out subsequent to the preparation of the bulk catalyst composition. It is preferred that the sulfidation is not carried out prior to any process step by which the obtained metal sulfides revert to their oxides. Such process steps are, e.g., a thermal treatment or spray-drying or any other high-temperature treatment if carried out under an oxygen-containing atmosphere. Consequently, if the bulk catalyst composition is subjected to spray-drying and/or any alternative technique or to a thermal treatment under an oxygen-containing atmosphere, the sulfidation preferably is carried out subsequent to the application of any of these methods. Of course, if these steps are carried out under an inert atmosphere, sulfidation can also be carried out prior to these steps. If the bulk catalyst composition is used in fixed bed processes, the sulfidation preferably is carried out subsequent to the shaping step and, if applied, subsequent to the last thermal treatment in an oxidizing atmosphere.

The sulfidation can generally be carried out in situ and/or ex situ. Preferably, the sulfidation is carried out in situ, i.e. the sulfidation is carried out in the hydroprocessing reactor after the oxidic bulk catalyst composition being loaded into the hydroprocessing unit.

The bulk catalyst composition according to the invention is particularly useful for hydroprocessing hydrocarbon feedstocks. Accordingly, the invention relates to a process for hydroprocessing a hydrocarbon feedstock, said process comprising contacting a hydrocarbon feedstock under hydroprocessing conditions with a catalyst composition comprising a metal oxide/C phase that comprises at least one Group VIII non-noble metal, at least one Group VIB metal and optionally Ni-crystals.

Characterization of the Bulk Catalyst Precursor and Bulk Catalysts $N_2$ adsorption isotherms of the catalysts were obtained using a Micromeretics Gemini-V analyzer. Samples were subjected to 120° C. and vacuum as a pre-treatment before the measurements. Values for the surface area were obtained using the so-called Brunauer-Ernett-Teller (BET) method the value will be referred to as SA-BET in the following text.

The composition of the bulk catalyst precursors or the bulk catalysts was determined using X-ray fluroscence (XRF) and a separate measurement of the C-content. The C-content was determined on the catalyst precursor using a combustion method and detection of the amount of $CO_2$ formed per quantity of sample. Before the XRF measurement, the catalyst precursor was subjected to a calcination treatment, typically to 600° C. in such a way that any organics were removed and a metal-oxide phase is obtained. At the same time the weight loss during this calcination procedure was measured. Using the weight loss during calcination (LOI600° C.), and the metal composition of the metal oxide obtained after calcination as determined by XRF [$MeO_x$ (wt % XRF)], the actual composition of the bulk catalyst precursor or the bulk catalyst was calculated using Equation 1.

$$MeO_x(\text{wt \%})=(100\%-LOI600° C.)*MeO_x(\text{wt \% XRF}) \quad \text{Equation 1}$$

The X-ray diffraction measurements were performed in a Q-Q Bragg-Brentano geometry using a Bruker D8Advance diffractometer that was equipped with a Cu anode (using X-ray radiation with a wavelength of 1.54 Å) and a LYNX-EYE detector. The sample was measured from 4-70.0° 2q with a step size of 0.05° 2q using fixed divergence- and anti-scatter slits of 0.5°. It is known in the art that the presence of any crystalline metal-oxide phases with the relevant compositions (i.e. containing Ni and Mo and or W), will result in the presence of at least one peak in the XRD pattern in the range of 10-40° 2 theta.

The broadness of a peak in XRD patterns is a function of the average crystallite size of the phase that is being observed. The Scherrer equation as presented in Equation 2 is commonly used to derive a crystallite size ($\tau$) from the broadness ($\beta$, the Full Width at Half Maximum, or FWHM in radians) of a peak at position $\theta$ in a XRD pattern (A. L. Patterson, *Phys. Rev.* 56, 978 1939). A value of 0.9 is often used for the dimensionless shape factor K, while $\alpha$ is the wavelength of the X-rays used: in this case 1.54 Å. It can easily be derived that for a crystalline phase with a reflection at 40° 2 theta, a crystal size of 5 nm will result in a FWHM of 2° 2 theta. For crystals smaller than 5 nm, the peak width will be even broader.

$$\tau = \frac{K\alpha}{\beta\cos\theta} \quad \text{Equation 2}$$

For this purpose, a crystalline metal-oxide phase is present when the crystal size of the metal-oxide crystalline domains is larger than 5 nm. Hence, when it is stated that any crystalline metal-oxide phases are absent in the catalyst precursors of the invention, it is meant that the XRD pattern of catalyst precursor of the invention does not show any peak with a FWHM of smaller than 2° 2 theta in the range of 10-40° 2 theta.

The XRD patterns of the NiW, NiMo bulk catalyst precursors 1-A to 1-D and (comparative) NiMoW bulk catalyst precursor 1-E and the catalyst that is formed from this precursor are presented in FIG. 1. It can be seen that for bulk catalyst precursors of the invention, the XRD patterns show either no peaks, showing that the material is almost amorphous (bulk catalyst precursor 1-A and 1-D), some very broad peaks with a full width at half the maximum (FWHM) of more than 2° 2 theta that can be attributed to the carbon-phase that is formed (bulk catalyst precursors 1-B and 1-C) and/or sharp peaks located at 2 theta=45° and 52° that can be attributed to Ni-crystals being formed during the partial decomposition step (bulk catalyst precursors 1-B and 1-C). The XRD patterns of other bulk catalyst precursors of the invention (2-A and 3-A) are presented in FIGS. 5 and 6, while the XRD patterns of bulk catalysts 4-A and 4-B of the invention are presented in FIG. 7. None of the XRD patterns of bulk catalyst precursors or bulk catalysts of the invention exhibit any peaks with a FWHM of smaller than 2° 2 theta in the range of 10-40° 2 theta. This indicates that no crystalline metal-oxide phase is present in these samples.

The XRD patterns of the NiMoW comparative bulk catalyst 1-E and its precursor show peaks, of which the ones with highest intensity are located at 2 theta=36° and 54° corresponding the formation of a distorted $NiWO_4$ phase. The FWHM of these peaks is smaller than 2° 2 theta, indicating the presence of a crystalline metal-oxide phase according to the definition explained above. This is in line with what has been generally shown in the prior art for bulk hydroprocessing catalysts with NiMo/W compositions prepared via precipitation.

Use in Hydroprocessing of the Invention

The catalyst composition according to the invention can be used in virtually all hydroprocessing processes to treat a plurality of feeds under wide-ranging reaction conditions such as temperatures of from 200 to 450° C., hydrogen pressures of from 5 to 300 bar, liquid hourly space velocities of from 0.05 to 10 h$^{-1}$ and hydrogen treat gas rates of from about 50 to about 2000 m$^3$/m$^3$ (280 to 11236 SCF/B). The term hydroprocessing used in the context of this invention encompasses all processes in which a hydrocarbon feedstock is reacted with hydrogen at the temperatures and pressures noted above, and including hydrogenation, hydrodesulfurization, hydrodenitrogenation, hydrodemetallization, hydrodearomatization, hydrodeoxygenation, hydroisomerization, hydrodewaxing, hydrotreating, hydrofinishing and hydrocracking.

The catalyst composition of the invention is particularly effective for the removal of nitrogen and sulfur from a hydrocarbon feed. Accordingly, in a preferred embodiment, the catalyst of the invention is used to remove sulfur, nitrogen, or a combination of sulfur and nitrogen, from hydrocarbon feedstocks. The contacting of the hydrocarbon feedstock with the catalyst composition occurs in the presence of a hydrogen-containing treat gas, and the reaction is operated under effective hydroprocessing conditions. The contacting of the hydrocarbon feedstock with the catalyst composition produces a hydrocarbon product that has less nitrogen, sulfur, or both, compared to the feedstock.

The hydrocarbon feedstock is a material comprising hydrogen and carbon. A wide range of petroleum and chemical hydrocarbon feedstocks can be hydroprocessed in accordance with the present invention. Hydrocarbon feedstocks include those obtained or derived from crude petroleum oil, from tar sands, from coal liquefaction, from shale oil and from hydrocarbon synthesis. The catalyst composition of the present invention is particularly effective for removing sulfur, nitrogen or a combination of sulfur and nitrogen from hydrocarbon feedstocks. Hydrocarbon feedstocks indeed often contain nitrogen and sulfur contaminants, often in the form of sulfur and/or nitrogen-containing organic compounds. Nitrogen contaminants may be basic or non-basic.

EXAMPLES

The following examples will serve to illustrate but not limit this invention.

Example 1 set out to compare NiMo/W bulk catalyst precursors prepared according to the invention vs. NiMoW bulk catalyst known in the art and supported NiMo-reference catalyst in high P (80 bar) hydrotreating of an HGO feed.

A first bulk catalyst precursor was created according to the embodiments discussed above. In a beaker glass, 17.01 g D-sorbitol (≥98 wt %) was dissolved in 100 ml water without heating. When the solution was clear, 10.59 g of ammonium heptamolybdate (81.5 wt % MoO$_3$) was added, resulting in a clear solution. Next, 9.00 g acetic acid (96 wt % acetic acid) was added and 7.47 g Nickel acetate (23.6 wt % Ni). A green clear solution was obtained. This solution was heated to 85° C. for one hour while evaporation of water was prevented by placing a watch glass on top of the beaker. The solution remained clear. This solution was transferred to a porcelain dish and placed in an oven at 120° C. for 14 hours under ambient conditions. After drying, a dark green solid was obtained. This material was placed in a rotary calciner and heated to 325° C. under a nitrogen flow with a ramp rate of 5° C./min and a hold time of 4 hours. The composition of the resulting material and the surface area as observed by nitrogen physisorption are presented in Table 1. The XRD pattern of this bulk catalyst precursor is presented in FIG. 1. TEM imaging was carried out on this bulk catalyst precursor. A characteristic image at a high magnification is presented as FIG. 2. This was bulk catalyst precursor 1-A.

A second bulk catalyst precursor was created according to the embodiments discussed above. In a beaker glass, 26.14 g of Nickel acetate (23.58 wt % Ni) was dissolved in 30.34 g of an aqueous gluconic acid solution (50 wt % gluconic acid) without heating. The resulting mixture was heated to 60° C. for 15 minutes resulting in a clear solution. Next, 24.64 g of ammonium metatungstate (94.10 wt % WO$_3$) was added while the temperature of the solution was kept at 60° C. Again a clear solution was obtained. This solution was transferred to a porcelain dish and placed in an oven at 120° C. for 14 hours under ambient conditions. After drying, a dark green solid was obtained. This material was placed in a rotary calciner and heated to 400° C. under a nitrogen flow with a ramp rate of 5° C./min and a hold time of 4 hours. The composition of the resulting material and the surface area as observed by nitrogen physisorption are presented in Table 1. The XRD pattern of this bulk catalyst precursor is presented in FIG. 1. TEM imaging was carried out on this bulk catalyst precursor. A characteristic image at a high magnification is presented as FIG. 3. This was bulk catalyst precursor 1-B.

A third bulk catalyst precursor was created according to the embodiments discussed above. In a beaker glass, 2.49 g of Nickel acetate (23.6 wt % Ni) was dissolved in 30.34 g of an aqueous gluconic acid solution (50 wt % gluconic acid) without heating. The resulting mixture was heated to 60° C. for 15 minutes resulting in a clear solution. Next, 24.64 g of ammonium metatungstate (94.1 wt % WO$_3$) was added while the temperature of the solution was kept at 60° C. Again a clear solution was obtained. This solution was transferred to a porcelain dish and placed in an oven at 120° C. for 14 hours under ambient conditions. After drying, a dark green solid was obtained. This material was placed in a rotary calciner and heated to 400° C. under a nitrogen flow with a ramp rate of 5° C./min and a hold time of 4 hours. The composition of the resulting material and the surface area as observed by nitrogen physisorption are presented in Table 1. The XRD pattern of this bulk catalyst precursor is presented in FIG. 1. TEM imaging was carried out on this catalyst precursor. A characteristic image at a high magnification is presented as FIG. 4. This was bulk catalyst precursor 1-C.

A fourth bulk catalyst precursor was created according to the embodiments discussed above. In a beaker glass, 16.38 g a D-glucose (anhydrous, 96%) was dissolved in 120 ml water. After the glucose was dissolved, 10.59 g ammonium heptamolybdate (81.5 wt % MoO$_3$) was added. Next, 9.00 g of acetic acid (96 wt % acetic acid) and 7.47 g Nickel acetate (23.6 wt % Ni) was added. The solution was heated to 85° C. for one hour, while evaporation of water is prevented by placing a watch glass on top of the beaker. The resulting solution still contained a small amount of solid material. In a second beaker glass, 16.83 g a D-glucose (anhydrous, 96%) was dissolved in 120 ml water. After the glucose was dissolved, 10.59 g ammonium heptamolybdate (81.5 wt % MoO$_3$) was added. Next, 9.00 g of acetic acid (96 wt % acetic acid) and 7.47 g Nickel acetate (23.6 wt % Ni) was added. The resulting solution contained a small amount of solid material of unknown origin. The content of both beakers was combined in a porcelain dish and placed in an oven at 120° C. for 14 hours under ambient conditions. After drying, a dark green solid was obtained. This material was placed in a rotary calciner and heated to 325° C. under a nitrogen flow with a ramp rate of 5° C./min and a hold time of 4 hours. The composition of the resulting material and the surface area as observed by nitrogen physisorption are presented in Table 1. The XRD pattern of this bulk catalyst precursor is presented in FIG. 1. This was bulk catalyst precursor 1-D.

A comparative catalyst was made according to teachings known in the art. A NiMoW bulk catalyst was prepared following the teachings of U.S. Pat. No. 6,566,296. In a reactor 755 g of Nickel hydroxy-carbonate (Containing 70.0 wt % Ni) was slurried in 500 ml water. The temperature was raised to 60° C. and 90 g molybdic acid (90 wt % $MoO_3$) was added. Next 137 g tungstic acid (70.31 wt % W) was added. This mixture was allowed to react for sufficient time for complete reaction of the starting materials. The resulting slurry was filtered to obtain the precipitate. This is comparative bulk catalyst precursor 1-E. The XRD pattern of this material is presented in FIG. 1. 597 g of the obtained solid was mixed with 241.85 g boehmite and 24.37 g of 65% $HNO_3$ and kneaded to obtain a homogeneous mixture. The water content in the extrusion mix was adjusted (by heating or water addition) in order to obtain an extrudable mix, as known to a person skilled in the art. The mix was extruded using apertures of 1.5 mm diameter and the extrudates were dried for one hour at 120° C. The resulting material was placed in a rotary calciner and heated to 385° C. under air flow with a ramp rate of 5° C./min and a hold time of 1 hour. The resulting material had the following composition as determined by XRF: $WO_3$ (31.4 wt %), NiO (31.3 wt %), $MoO_3$ (20.6) and $Al_2O_3$ (15.6 wt %). The SA-BET of this material as measured using $N_2$ physisorption was larger than 120 $m^2$/g. Although part of this SA originates from the $Al_2O_3$, the low concentration of this component cannot account for this high SA. This means that the metal-oxide bulk catalyst precursor 1-E also has a significant SA-BET. Subsequently, 4.4 grams diethylene glycol was weighed and diluted with water of a sufficient volume to carry out a pore volume impregnation on the extrudates. The resulting solution was added to 50 g of the above mentioned calcined extrudates. Impregnation was done for approximately 30 minutes at 120° C. in a closed container under regular mixing. Next, the extrudates were heated while rotating until the extrudates reached a temperature of 90° C., as a sign that the material was dry and all water had evaporated. The composition of the resulting material and the surface area as observed by nitrogen physisorption are presented in Table 1. The XRD pattern of this catalyst is presented in FIG. 1 as well. This is Comparative bulk catalyst 1-E.

As a second comparative catalyst, a supported NiMo—$Al_2O_3$ catalyst that is a commercial catalyst for high P hydrotreating of distillate feeds was included in the testing. The composition and the surface area of this catalyst as observed by nitrogen physisorption are presented in Table 1. This is Comparative catalyst 1-F.

From the data in Table 1, it can be observed that the SA of the bulk catalysts precursors 1-A to 1-D is very small, in all cases smaller than can be measured using the $N_2$ physisorption method. For comparative catalyst 1-E and 1-F on the other hand, a high SA is observed.

TABLE 1

Composition and SA-BET as determined by $N_2$ physisorption of bulk catalyst precursors (b.c.p.) 1-A-1-D and comparative catalysts 1-E and 1-F.

| | b.c.p. 1-A | b.c.p. 1-B | b.c.p. 1-C | b.c.p. 1-D | Comparative bulk catalyst 1-E | Comparitive catalyst 1-F |
|---|---|---|---|---|---|---|
| NiO (wt %) | 12.4 | 21.3 | 2.4 | 11.7 | 27.1 | 3.3 |
| CoO (wt %) | | | | | | |
| $MoO_3$ (wt %) | 47.6 | | | 44.6 | 17.9 | 20.0 |
| $WO_3$ (wt %) | | 63.1 | 74.7 | | 27.2 | |
| Ni:(Mo + W) | 0.50 | 1.05 | 0.10 | 0.50 | 1.50 | 0.32 |
| C (wt %) | 29.4 | 13.9 | 15.7 | 29.2 | 3.9 | n.a. |
| C:(Mo + W) | 7.4 | 4.3 | 4.1 | 7.9 | 1.3 | n.a. |
| LOI 600° C. (wt %) | 40.0 | 15.6 | 22.9 | 43.9 | 13.3 | 17.2 |
| SA-BET ($m^2$/g) | <5 | <5 | <5 | <5 | 126 | 121 |

Bulk catalyst precursors 1-A-1-D according to the invention are characterized by the presence of a significant amount of carbon and a molar ratio of C:(Mo+W) of at least 4. Furthermore, in contrast to comparative catalysts 1-E and 1-F, the surface area of the catalysts according to the invention is always smaller than 5 $m^2$/g. The XRD pattern of bulk catalyst precursors 1-A-1-D according to the invention, the precursor to Comparative bulk catalyst 1-E and the Comparative bulk catalyst 1-E are presented in FIG. 1. The patterns of Comparative bulk catalyst precursor 1-E and Comparative bulk catalyst 1-E show the most intense peaks at 2 theta=36° and 54°. These peaks can be attributed to the presence of a distorted nano-crystalline $NiWO_4$ phase. No peaks with a FWHM smaller than 2° 2 theta are present in the 2 theta range of 10-40° of the XRD pattern of the bulk catalyst precursors 1-A to 1-D according to the invention. The sharp peaks (the FWHM is smaller than 1° 2 theta) that are observed at 45 and 52 degrees 2 theta in the pattern of catalysts 1-A and 1-B can be attributed to Ni-crystals being formed and are not the result of any crystalline metal-oxide phase.

Figure 2:
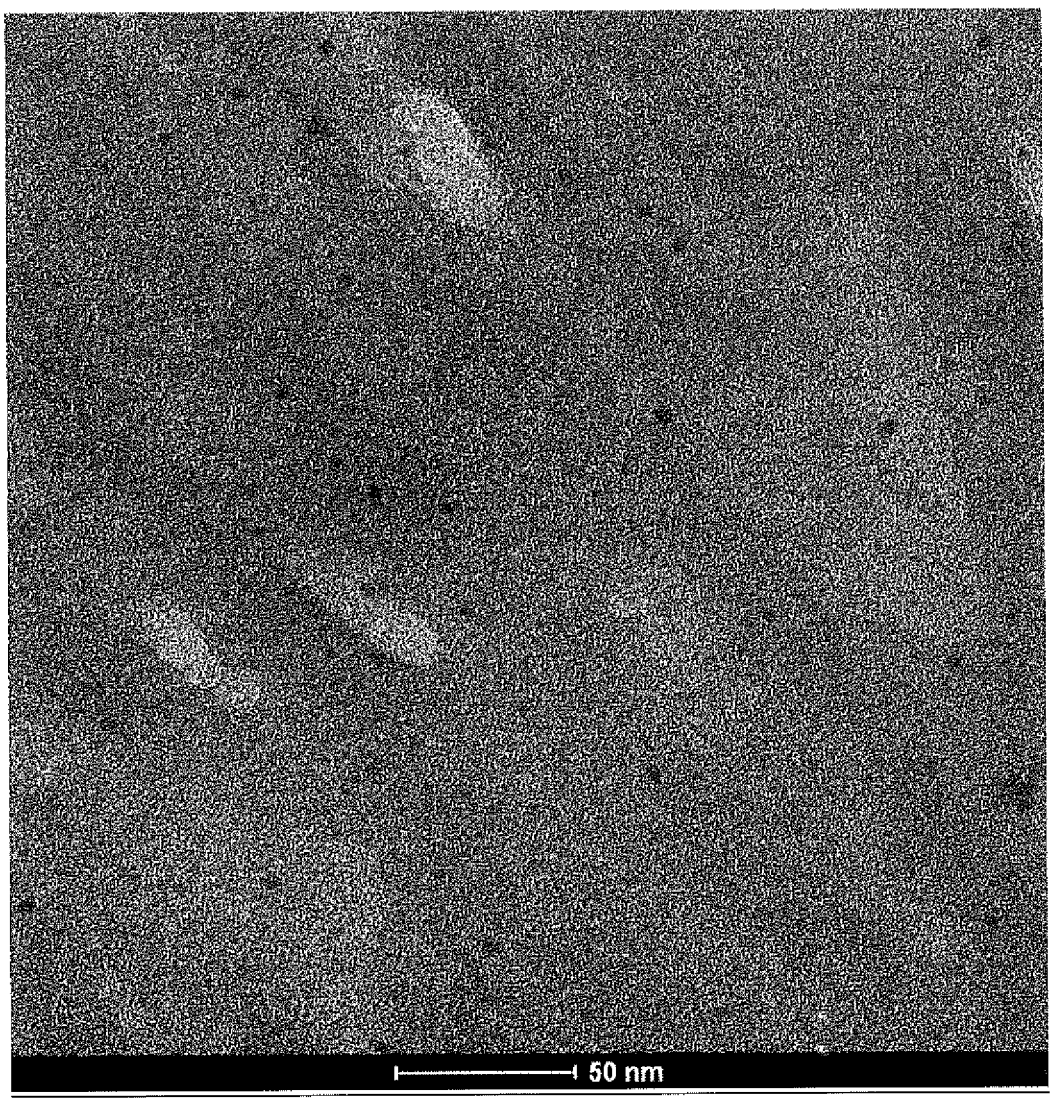
FIG. 2 TEM image of bulk catalyst precursor 1-A at high magnification.
Figure 3:
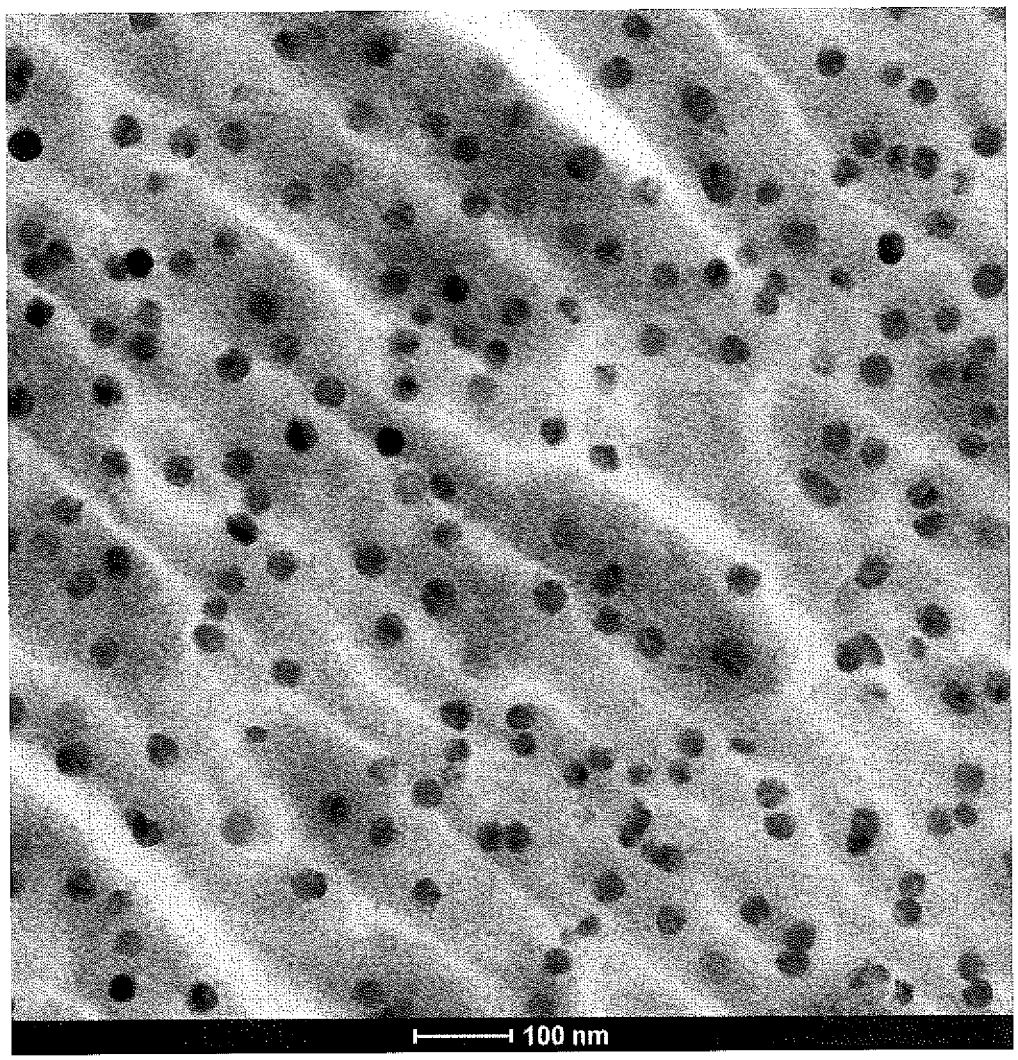
FIG. 3 TEM image of bulk catalyst precursor 1-B at high magnification.
Figure 4:
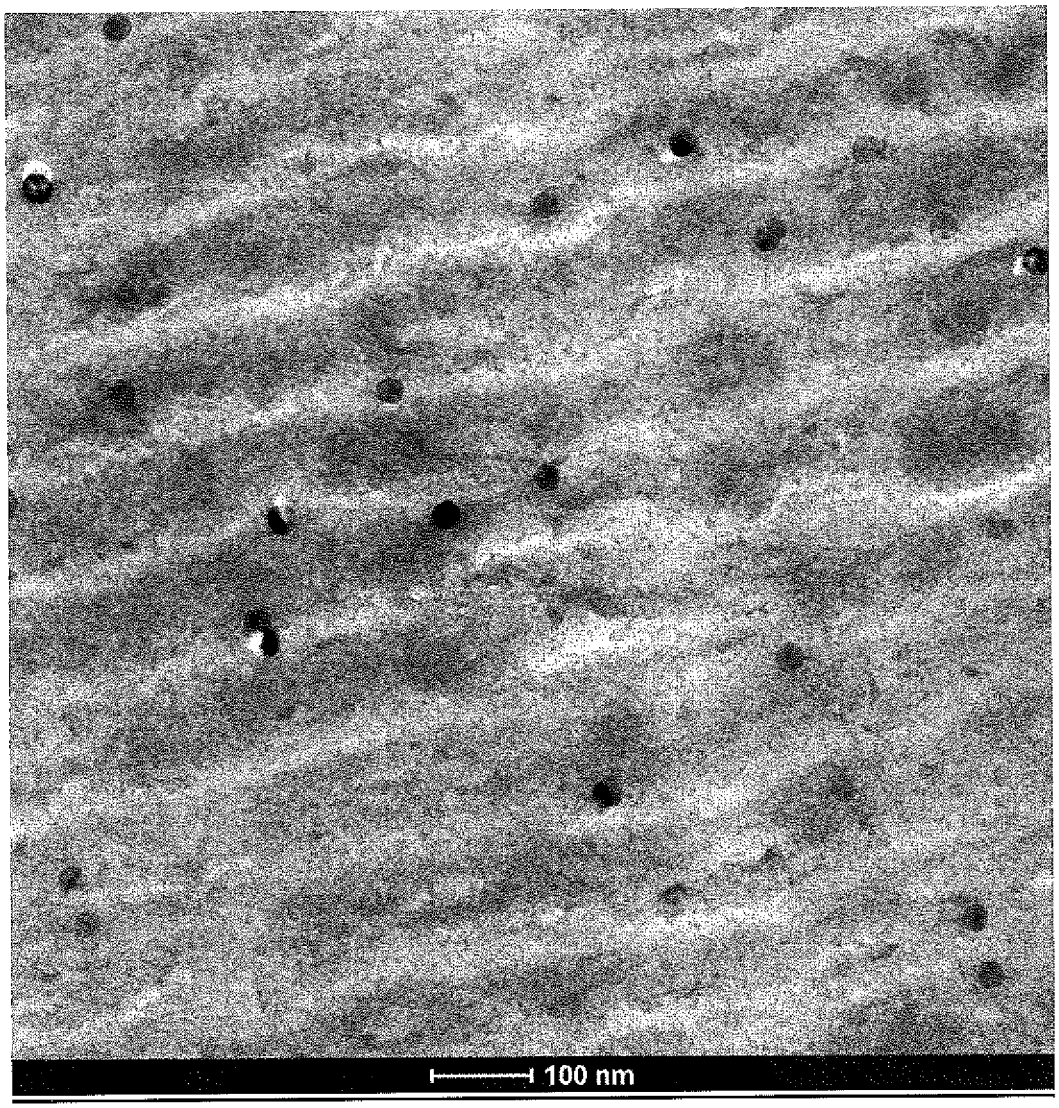
FIG. 4 TEM image of bulk catalyst precursor 1-C at high magnification.

In the TEM images of bulk catalyst precursors 1-A, 1-B and 1-C as presented in FIG. 2-4, the presence of Ni-crystals was also clearly observed. A general feature of bulk catalyst precursor of the invention is that the Ni-crystals that are formed are very well dispersed in the sense that (i) the spatial distribution of the particle throughout the sample is very homogeneous and (ii) the particles size distribution is extremely narrow. As can be seen in FIG. 2, in bulk catalyst precursor 1-A, the Ni-crystals are small (<5 nm in diameter) and the concentration is low. For this reason, no peaks are observed in the corresponding XRD pattern, despite the presence of a crystalline Ni-phase. Hence, the absence of any peaks in the XRD pattern does not mean that no Ni-crystals are present in the bulk catalyst precursors. The presence of Ni-crystals in the TEM-micrographs (FIGS. 3 and 4) is even more pronounced in bulk catalyst precursors 1-B and 1-C.

Testing Procedure: The bulk catalyst precursors and the Comparative catalysts were sized to a sieve fraction of 125-300 μm and loaded in a reactor with 0.9 ml volume. The test unit used for performance testing allowed for the side-by-side testing of different catalysts at identical processing conditions (temperature, pressure, feed and $H_2$/oil ratio), while the LHSV can be adjusted for each catalyst, e.g. via the catalyst intake. The catalysts were pre-sulfided using a 2.5 wt % DMDS spiked LGO feed that was fed over the catalyst at a LHSV of 3.0 at 45 bar and with a $H_2$/oil ratio of 300 nl/l. The T program that was used during pre-sulfiding is given in Table 2. The catalytic activity of the catalysts was evaluated at 80 bar pressure, 341° C. and a H₂/oil ratio of 500 nl/l in processing an HGO with feed characteristics as presented in Table 3.

TABLE 2

Pre-sulfidation T-protocol used for the activation of bulk catalyst precursors 1-A-1-D and comparative catalysts 1-E and 1-F.

| | Start T (° C.) | End T (° C.) | Time (h) |
|---|---|---|---|
| Step 1 | 21 | 21 | 24 |
| Step 2 | 21 | 150 | 3 |
| Step 3 | 150 | 250 | 10 |
| Step 4 | 250 | 250 | 14 |

TABLE 2-continued

Pre-sulfidation T-protocol used for the activation of bulk catalyst precursors 1-A-1-D and comparative catalysts 1-E and 1-F.

| | Start T (° C.) | End T (° C.) | Time (h) |
|---|---|---|---|
| Step 5 | 250 | 345 | 19 |
| Step 6 | 345 | 345 | 12 |

TABLE 3

Properties of the HGO feed used for performance testing of bulk catalyst precursors 1-A-1-D and comparative catalysts 1-E and 1-F.

| | |
|---|---|
| S-content (ppmwt) | 14773 |
| N-content (ppmwt) | 542 |
| Density at 15° C. (g/ml) | 0.8981 |
| Initial boiling point (° C.) | 208 |
| Boiling point at 50 wt % (° C.) | 355 |
| Boiling point at 90 wt % (° C.) | 416 |
| Boiling point at 95 wt % (° C.) | 431 |

The volume and weight of the catalysts in the different reactors and the S and N content of the resulting product at different reaction conditions is given in Table 4. The catalyst intake is presented in grams on dry basis (g, d.b.). This means the weight of the bulk catalyst precursor or the catalyst after calcination at 600° C. in air. First of all, it can be observed that all bulk catalyst precursors are more active than Comparative catalyst 1-F, the commercial NiMo/Al₂O₃ catalyst. At a LHSV of 2.0, the Comparative catalyst 1-F was able to produce a product with 762 ppm S and 52 ppm N. Bulk catalyst precursors 1-A to 1-D and the Comparative bulk catalyst 1-E are able to produce a product with a lower concentration of N at a LHSV of 2.4, which indicates that the relative volumetric activity of these catalysts is at least 20% higher than Comparative catalyst 1-F. Furthermore, it can be seen that the bulk catalyst precursors 1-A-1-D of the invention are considerably more active in terms of HDN activity than the Comparative bulk catalyst 1-E. At a LHSV of 2.4, the comparative catalysts 1-E was able to produce a product with 50 ppm N, while the catalysts of the invention produce a product with 28 ppm N or less. In a number of hydroprocessing applications, such as hydrocracking pretreat and FCC pretreat treatment of typically vacuum gasoil type feed, the removal of nitrogen is the primary objective. In these operations, the bulk catalyst precursors of the invention all have a considerable advantage over Comparative catalyst 1-E. The high activity of bulk catalyst precursors 1-A to 1-D of the invention vs. the comparative catalysts is surprising considering the low SA-BET of these catalysts.

TABLE 4

Catalyst intake and observed conversion for bulk catalyst precursors 1-A-1-D and comparative catalysts 1-E and 1-F in a 80 bar test processing HGO.

| | b.c.p. 1-A | b.c.p. 1-B | b.c.p. 1-C | b.c.p. 1-D | Comparative 1-E | Comparative 1-F |
|---|---|---|---|---|---|---|
| intake volume (ml) | 0.45 | 0.45 | 0.45 | 0.45 | 0.45 | 0.90 |
| intake weight (g, d.b.) | 0.28 | 0.72 | 0.39 | 0.27 | 0.60 | 0.81 |
| LHSV (ml$_{feed}$*ml$_{catalyst}$$^{-1}$*h$^{-1}$) | 4.0 | 4.0 | 4.0 | 4.0 | 4.0 | — |
| S (ppmwt) | 1044 | 224 | 3813 | 1207 | 1420 | — |
| N (ppmwt) | 64 | 36 | 99 | 78 | 138 | — |
| LHSV (ml$_{feed}$*ml$_{catalyst}$$^{-1}$*h$^{-1}$) | 2.4 | 2.4 | 2.4 | 2.4 | 2.4 | 2.0 |
| S (ppmwt) | 281 | 35 | 1592 | 406 | 689 | 762 |
| N (ppmwt) | 6 | <3 | 28 | 9 | 50 | 52 |

Example 2 set out to compare a NiW bulk catalyst precursor prepared according to the invention vs. a CoMo bulk catalyst precursor known in the art and a supported CoMo-reference catalyst in low P (30 bar) hydroprocessing of a LGO feed. In a beaker glass, 12.44 g Ni acetate (23.6 wt % Ni) was dissolved in 30.34 g of a gluconic acid solution (containing 50 wt % D-gluconic acid) at ambient T. 24.64 g of ammonium meta tungstate (94.1 wt % WO₃) was added and the solution was heated to 70° C. under constant stirring, resulting in a clear solution. This solution was dried in a static oven at 120° C. for 5 hours. The resulting brown-greenish solid was placed in a rotary calciner and heated to 400° C. under nitrogen flow with a ramp rate of 5° C./min and a hold time of 4 hours. The composition of the resulting material and the surface area as observed by nitrogen physisorption are presented in Table 5. The XRD pattern of this bulk catalyst precursor is presented in FIG. 5. This is bulk catalyst precursor 2-A.

Next, two comparative catalysts were prepared. First, a comparative CoMo bulk catalyst precursor was prepared by the following process, as disclosed in U.S. Pat. No. 7,951,746. In a beaker glass, 25.74 g Cobalt acetate (23.7 wt % Co) was dissolved in 165 ml of a glyoxylic acid solution (50 wt % glyoxylic acid) at ambient temperature. 36.38 g ammonium heptamolybdate (81.5 wt % MoO₃) was added and the solution was heated to 80° C. under constant stirring. When the T reaches around 60° C., the reaction of the ammonium heptamolybdate is rather vigorous and the formation of foam is observed. After an hour stirring at 80° C., a solution is obtained that is almost clear, but still contains a minor amount of solid material. The resulting mixture was dried overnight in a static oven at 120° C. The darkly colored solid was placed in a rotary calciner and heated to 325° C. under a flow of dry air with a ramp rate of 5° C./min and a hold time of 4 hours. The composition of the resulting material and the surface area as observed by nitrogen physisorption are presented in Table 5. The XRD pattern of this bulk catalyst precursor is presented in FIG. 5. This is Comparative bulk catalyst precursor 2-B.

A supported CoMo—$Al_2O_3$ catalyst was prepared by impregnation of a CoMo-solution onto a commercial $Al_2O_3$ support used for the preparation of hydrotreating catalysts. The $\gamma$-$Al_2O_3$ extrudates have a SA-BET of 267 m$^2$/g, a mean pore diameter as determined by $N_2$ desorption of 8 nm and a pore volume as determined by $N_2$ physisorption of 0.78 ml/g. A $Co_3^{2+}[Co_2Mo_{10}O_{38}H_4]^{6-}$ solution was prepared with a metal loading comparable to commercial CoMo—$Al_2O_3$ catalysts using a method for making the impregnation solution as published in an article in Langmuir 2013, 29, 207-215. The impregnation solution was prepared by mixing 180.0 g $MoO_3$ (100%) with 0.80l water in a beaker glass. Subsequently, 612.5 g of a $H_2O_2$ solution was added (30 wt % $H_2O_2$) and the suspension was heated to 40° C. After about 2 hours stirring at 40° C., a clear solution is obtained. To this solution, 79.9 g of $CoCO_3$ (46 wt % Co) was added in small portions in a period of 45 minutes. The resulting mixture was heated to 90° C. and was allowed to react for 2 hours. The solution was divided over 9 autoclaves containing 50 ml of solution each, which were heated under autogenic pressure to 150° C., where they were kept for 2 hours. The resulting solution was spray-dried using a bench top spray-dryer of the type Buchi Mini Spraydryer B-290 equipped with inert loop B295. During spray-drying, the inlet temperature was 180° C. and the outlet temperature 100-110° C. The solution was supplied to the spray-dryer with a throughput of approximately 200 ml/hour. The obtained powder was re-dissolved in water to obtain the impregnation solution. The final catalyst was obtained by pore volume impregnation of this solution onto the alumina carrier, whereby the solution volume and concentration were adjusted to arrive at the desired composition of the final catalyst. The final catalyst contained 23.81% $MoO_3$ and 6.16% CoO as determined by XRF after calcination at 600° C. This composition is in line with the composition of commercial CoMo—$Al_2O_3$ catalysts that are generally applied in this application. The composition of the resulting material and the surface area as observed by nitrogen physisorption are presented in Table 5. This is Comparative catalyst 2-C.

From the data in Table 5, it can be observed that the SA of the bulk catalyst precursor 2-A is smaller than can be measured using the $N_2$ physisorption method. For the Comparative bulk catalyst precursor 2-B the SA is extremely low, while for Comparative catalyst 2-C a high SA is observed.

Figure 5:
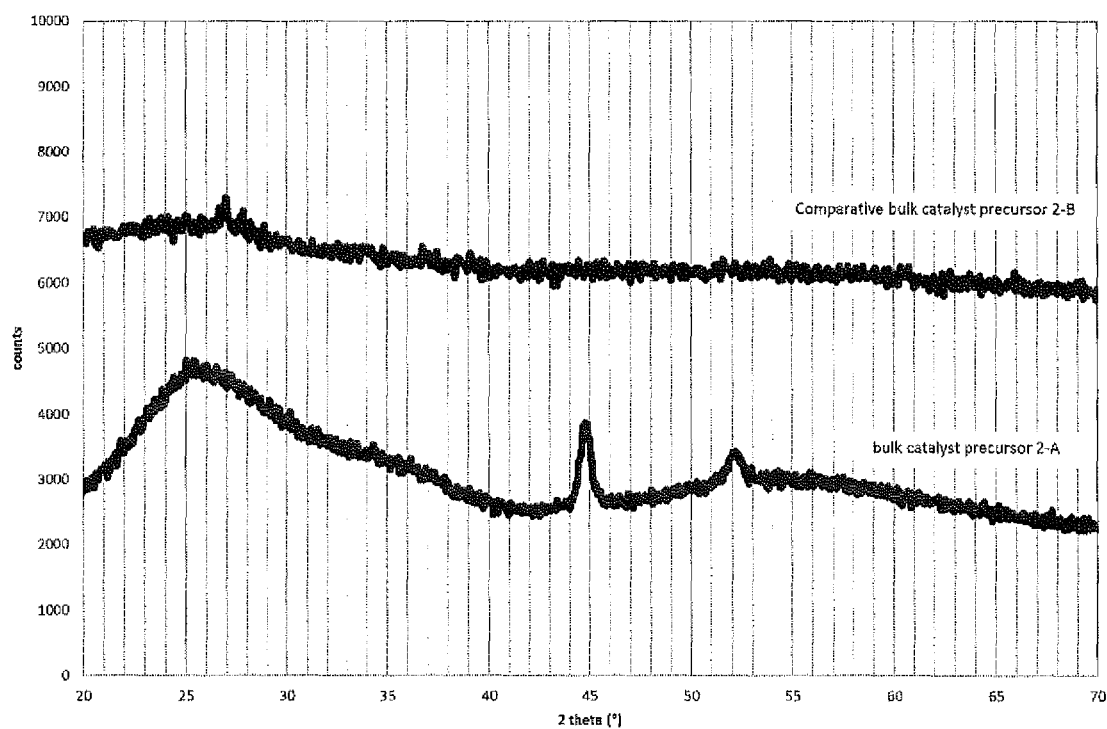
FIG. 5 XRD patterns of bulk catalyst precursor 2-A according to the invention and a comparative bulk catalyst precursor 2-B.

In FIG. 5, the XRD patterns of bulk catalyst precursor 2-A and Comparative bulk catalyst precursor 2-B are presented. No peaks in the range of 10-40° 2 theta are observed in the XRD pattern of either bulk catalyst precursor indicative of an absence of any (nano)crystalline metal-oxide phase. It can be observed that in the XRD pattern of bulk catalyst precursor 2-A, a sharp peak is present at about 45° 2 theta, which can be attributed to the presence of Ni-crystals. This peak is absent In Comparative bulk catalyst precursor 2-B.

TABLE 5

Composition and SA-BET as determined by $N_2$ physisorption of bulk catalyst precursor 2-A, comparative bulk catalyst precursor 2-B and comparative catalyst 2-C.

|  | b.c.p. 2-A | Comparative 2-B | Comparative 2-C |
|---|---|---|---|
| NiO (wt %) | 11.1 |  |  |
| CoO (wt %) |  | 14.8 | 5.6 |
| MoO3 (wt %) |  | 56.9 | 21.6 |
| WO3 (wt %) | 68.7 |  |  |
| C (wt %) | 16.0 | 18.9 | 0.0 |
| C:(Mo + W) | 4.5 | 4.0 | 0.0 |
| LOI 600° C. (wt %) | 20.3 | 28.4 | 9.4 |
| SA-BET (m$^2$/g)) | <5 | 6.2 | 220 |

The bulk catalyst precursors and the supported catalyst were sized to a sieve fraction of 125-300 μm and loaded in a reactor with 0.9 ml volume. The test unit used for performance testing allowed for the side-by-side testing of different catalysts at identical processing conditions. The catalysts were pre-sulfided using a 2.5 wt % DMDS spiked LGO feed that was fed over the catalyst at a LHSV of 3.0 at 30 bar and with a H2/oil ratio of 300 nl/l. The T program that was used during pre-sulfiding is given in Table 6. The catalytic activity of the catalysts was evaluated at 30 bar pressure, 350° C. and a H2/oil ratio of 200 nl/l in processing an LGO with feed characteristics as presented in Table 7.

TABLE 6

Pre-sulfidation T-protocol used for the activation of samples 2-A-2-C.

|  | Start T (° C.) | End T (° C.) | Time (h) |
|---|---|---|---|
| Step 1 | 21 | 21 | 24.0 |
| Step 2 | 21 | 250 | 7.3 |
| Step 3 | 250 | 250 | 8.2 |
| Step 4 | 250 | 320 | 3.5 |
| Step 5 | 320 | 320 | 5.0 |

TABLE 7

Properties of the LGO feed used for performance testing of samples 2-A-2-C.

| S-content (ppmwt) | 12467 |
| N-content (ppmwt) | 146 |
| Density at 15° C. (g/ml) | 0.850 |
| Initial boiling point (° C.) | 131 |
| Boiling point at 50 wt % (° C.) | 309 |
| Boiling point at 90 wt % (° C.) | 383 |
| Boiling point at 95 wt % (° C.) | 402 |

The volume and weight of the samples in the different reactors and the S content of the resulting product at different reaction conditions is given in Table 8. It can be observed that the HDS activity of the NiW bulk catalyst catalyst precursor 2-A is significantly higher than the activities of the Comparative CoMo bulk catalyst precursor 2-B and the Comparative CoMo—$Al_2O_3$ catalyst 2-C. The NiW bulk catalyst precursor 2-A manages to reach a lower S value (12 ppm) at a LHSV of 1.5 than the Comparative CoMo bulk catalyst precursor 2-B at a LHSV of 1.2 (89 ppm) and the Comparative supported catalyst 2-C(240 ppm) at a LHSV of 1.5. Since normally catalysts with a CoMo composition are being applied in low P hydroprocessing of Distillate feeds, this is a surprising finding.

TABLE 8

Catalyst intake, LHSV applied and observed conversion for bulk catalyst precursor 2-A, comparative bulk catalyst precursor 2-B and comparative catalyst 2-C in a 30 bar test processing LGO.

| | b.c.p. 2-A | Comparative 2-B | Comparative 2-C |
|---|---|---|---|
| intake volume (ml) | 0.90 | 0.90 | 0.90 |
| intake weight (g, d.b.) | 1.19 | 0.73 | 0.66 |
| LHSV ($ml_{feed} * ml_{catalyst}^{-1} * h^{-1}$) | 1.5 | 1.2 | 1.5 |
| S (ppmwt) | 12 | 89 | 240 |
| N (ppmwt) | <3 | 10 | 64 |

Example 3 set out to compare a NiMoW bulk catalyst precursor prepared according to the invention vs. a CoMo bulk catalyst precursor using the exact same preparation method in medium P (45 bar) processing of a LGO feed. In a beaker glass, 12.44 g Nickel acetate (23.6 wt % Ni) was dissolved in 30.34 g of a gluconic acid solution (50 wt % D-gluconic acid) at ambient T. 12.32 g of ammonium meta tungstate (94.1 wt % $WO_3$) and 8.83 g of ammoniumheptamolybdate (81.5 wt % $MoO_3$) was added and the solution was heated to 70° C. under constant stirring and kept at this temperature, while preventing the evaporation of water for one hour. The resulting solution was dried in a static oven at 120° C. for 5 hours. The resulting solid was placed in a rotary calciner and heated to 400° C. under nitrogen flow with a ramp rate of 5° C./min and a hold time of 4 hours. The composition of the resulting material and the surface area as observed by nitrogen physisorption are presented in Table 9. The XRD pattern of this bulk catalyst precursor is presented in FIG. 6. This is bulk catalyst precursor 3-A.

A comparative CoMo bulk catalyst precursor was prepared by the same method. In a beaker glass, 12.45 g Cobalt acetate (23.7 wt % Co) was dissolved in 30.34 g of a gluconic acid solution (50 wt % D-gluconic acid) at ambient T. 17.66 g of ammonium heptamolybdate (81.5 wt % Mo) was added and the solution was heated to 70° C. under constant stirring. The resulting solution was dried overnight in a static oven at 120° C. for 5 hours. The resulting solid was placed in a rotary calciner and heated to 400° C. under nitrogen flow with a ramp rate of 5° C./min and a hold time of 4 hours. The composition of the resulting material and the surface area as observed by nitrogen physisorption are presented in Table 9. The XRD pattern of this bulk catalyst precursor is presented in FIG. 6. The resulting material is Comparative bulk catalyst precursor 3-B.

Figure 6:
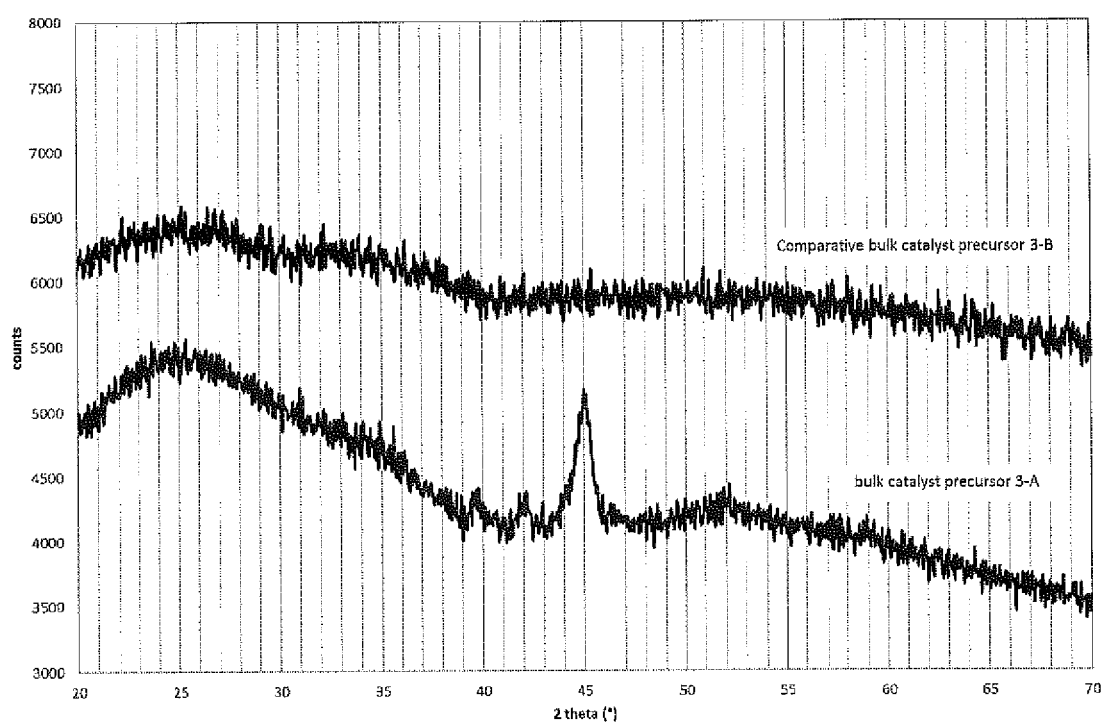
FIG. 6 XRD patterns of bulk catalyst precursor 3-A according to the invention and a comparative bulk catalyst precursor 3-B.
Figure 7:
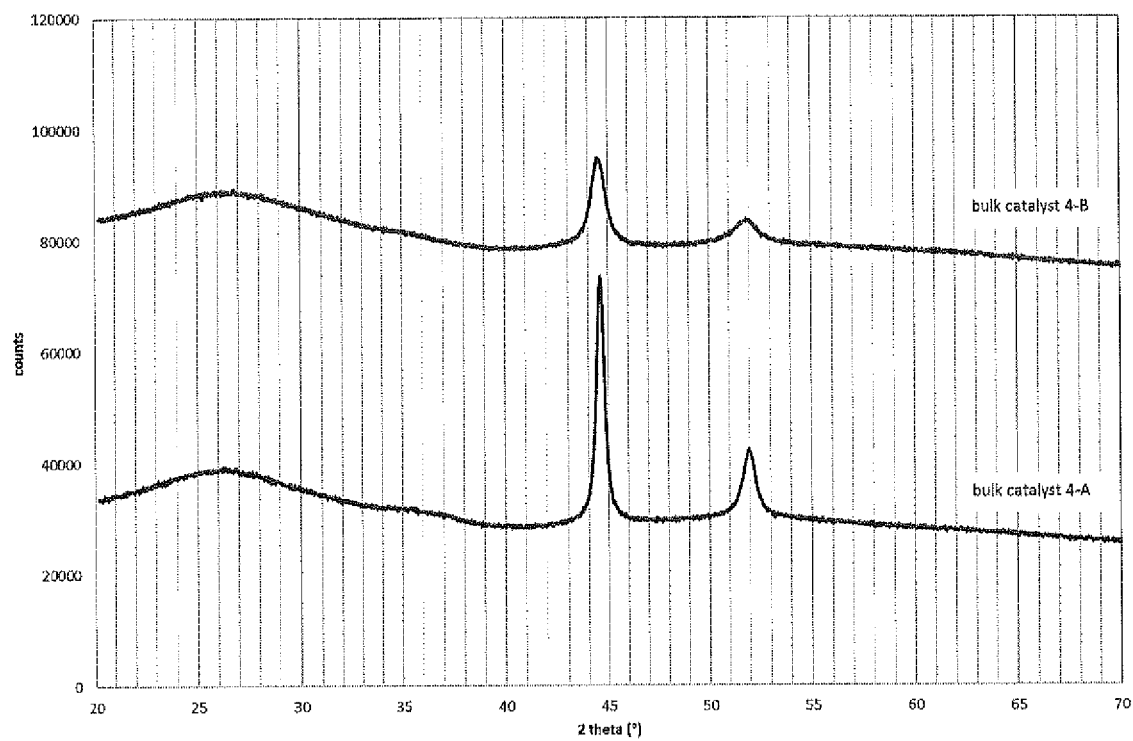
FIG. 7 XRD patterns of bulk catalysts 4-A and 4-B according to the invention.

From the data in Table 9, can be observed that the SA of both catalysts is smaller than can be measured using the $N_2$ physisorption method. In FIG. 6, the XRD patterns of bulk catalyst precursor 3-A and Comparative bulk catalyst precursor 3-B are presented. No peaks in the range of 10-40° 2 theta are observed in the XRD pattern of either bulk catalyst precursor indicative of the absence of any (nano)crystalline metal-oxide phase. It can be observed that in the XRD pattern of bulk catalyst precursor 3-A, a sharp peak is present at about 45° 2 theta which can be attributed to the presence of Ni-crystals. This peak is absent In Comparative bulk catalyst precursor 3-B.

TABLE 9

Composition and SA-BET as determined by $N_2$ physisorption of bulk catalyst precursors 3-A and 3-B.

| | b.c.p. 3-A | Comparitive 3-B |
|---|---|---|
| NiO (wt %) | 14.2 | — |
| CoO (wt %) | — | 15.0 |
| MoO3 (wt %) | 41.1 | 57.8 |
| WO3 (wt %) | 22.0 | — |
| C (wt %) | 20.0 | 22.5 |
| C:(Mo + W) | 4.4 | 4.7 |
| LOI 600° C. (wt %) | 22.7 | 27.2 |
| SA ($m^2/g$) | <5 | <5 |

Testing Procedure: The bulk catalyst precursors were sized to a sieve fraction of 125-300 µm and loaded in a reactor with 0.9 ml volume. The test unit used for performance testing allowed for the side-by-side testing of different catalysts at identical processing conditions. The samples were pre-sulfided using a 2.5 wt % DMDS spiked LGO feed that was fed over the catalyst at a LHSV of 3.0 at 45 bar and with a $H_2$/oil ratio of 300 nl/l. The T program that was used during pre-sulfiding is given in Table 10. The catalytic activity of the catalysts was evaluated at 45 bar pressure, 350° C. and a $H_2$/oil ratio of 300 nl/l in processing an LGO with feed characteristics as presented in Table 11.

TABLE 10

Pre-sulfidation T-protocol used for the activation of samples 3-A and 3-B.

| | Start T (° C.) | End T (° C.) | Time (h) |
|---|---|---|---|
| Step 1 | 21 | 21 | 3.0 |
| Step 2 | 21 | 250 | 7.7 |
| Step 3 | 250 | 250 | 14.3 |
| Step 4 | 250 | 320 | 3.5 |
| Step 5 | 320 | 320 | 27.5 |

TABLE 11

Properties of the LGO feed used for performance testing of samples 3-A and 3-B.

| | |
|---|---|
| S-content (ppmwt) | 10961 |
| N-content (ppmwt) | 199 |
| Density at 15° C. (g/ml) | 0.8587 |
| Initial boiling point (° C.) | 139 |
| Boiling point at 50 wt % (° C.) | 315 |
| Boiling point at 90 wt % (° C.) | 382 |
| Boiling point at 95 wt % (° C.) | 400 |

The volume and weight of the bulk catalyst precursors in the different reactors, the space velocity that was applied and the N and S content of the resulting product at different reaction conditions is given in Table 12. It can be observed that the HDS and HDN activity of the NiMoW bulk catalyst precursor 3-A is significantly higher than that of the Comparative bulk CoMo catalyst precursor 3-B. For example, bulk catalyst precursor 3-A manages to reach significantly lower S values (39 ppm) at a LHSV of 3.0 than Comparative bulk catalyst precursor 3-B (72 ppm) at a LHSV of 2.0. This implies that bulk catalyst precursor 3-A of the invention has a volumetric HDS-activity of more than 150% vs. Comparative bulk catalyst precursor 3-B. This is a surprising finding, as for this type of conditions (medium P hydrotreating of distillate feeds), catalysts with CoMo compositions are generally applied.

TABLE 12

Catalyst intake, LHSV applied and observed conversion for bulk catalyst precursors 3-A and 3-B in a 45 bar test processing LGO.

|  | b.c.p. 3-A | Comparitive 3-B |
|---|---|---|
| intake volume (ml) | 0.90 | 0.90 |
| intake weight (g, d.b.) | 0.73 | 0.50 |
| LHSV ($ml_{feed} * ml_{catalyst}^{-1} * h^{-1}$) | 3.0 | 3.0 |
| S (ppmwt) | 39 | 336 |
| N (ppmwt) | <3 | 7 |
| LHSV ($ml_{feed} * ml_{catalyst}^{-1} * h^{-1}$) | 2.0 | 2.0 |
| S (ppmwt) | 13 | 72 |
| N (ppmwt) | <3 | <3 |

Example 4 set out to illustrate the shaping of bulk catalyst precursors of the invention to form bulk catalysts of the invention and their application in high pressure hydroprocessing. In a beaker glass, 134.66 g Nickel hydroxy carbonate (48.4 wt % Ni) was slurried in 300 ml water and heated to 75° C. After approximately 30 minutes, 217.78 g of $MoO_3$ (100 wt % $MoO_3$) was added in small portions: the formation of $CO_2$ is observed by the formation of bubbles. The temperature was increased to 90° C. and the mixture was allowed to react for 2 hours, while evaporation of water was prevented by placing a lid on the beaker. Subsequently, 400 g of a 50 wt % gluconic acid solution was added. A clear intensely dark blue-green solution was obtained. This solution was dried overnight in a static oven at 120° C. for 5 hours. The resulting solid was placed in a rotary calciner and heated to 450° C. under nitrogen flow with a ramp rate of 5° C./min and a hold time of 4 hours. This is bulk catalyst precursor 4-A.

In a beaker glass, 80.79 g Nickel hydroxy carbonate (48.4 wt % Ni) was slurried in 300 ml water and heated to 75° C. After approximately 30 minutes, 130.67 g of $MoO_3$ (100 wt % $MoO_3$) was added in small portions: the formation of $CO_2$ is observed by the formation of bubbles. The temperature was increased to 90° C. and the mixture was allowed to react for 2 hours, while evaporation of water was prevented by placing a lid on the beaker. Subsequently, 400 g of a 50 wt % gluconic acid solution was added. A clear intensely dark blue-green solution was obtained. This solution was dried overnight in a static oven at 120° C. for 5 hours. The resulting solid was placed in a rotary calciner and heated to 350° C. under nitrogen flow with a ramp rate of 5° C./min and a hold time of 4 hours. This is bulk catalyst precursor 4-B.

The bulk catalyst precursors were milled using a ball-mill and subsequently wet-mixed with approximately 5 wt % percent of an oxidic binder material (based on the total weight of the catalyst composition). The water content of the mixture was adjusted in order to obtain an extrudable mix, and the mixture was subsequently extruded. The resulting solid cylindrical extrudates were dried at 120° C. for 16 hours (overnight). In this way, bulk catalysts 4-A and 4-B were obtained. These catalysts show sufficiently high strength and low abrasion to be loaded in a commercial fixed bed hydrotreating reactor. The XRD patterns of these bulk catalysts are presented in FIG. 7.

The composition of bulk catalysts 4-A and 4-B and the surface area as observed by nitrogen physisorption of the extrudates are presented in Table 13. It can be observed that both bulk catalysts show a very low or no SA-BET. In the XRD patterns in FIG. 7, it can be observed that peaks are present at 45° and 52° 2 theta, indicating the presence of Ni-crystals in these bulk catalysts. No peaks are observed in the range of 10-40° 2 theta, showing that no nano-crystalline metal-oxide phase is present in these bulk catalysts.

TABLE 13

Composition, SA-BET as determined by $N_2$ physisorption of bulk catalysts 4-A and 4-B.

|  | Bulk catalyst 4-A | Bulk catalyst 4-B |
|---|---|---|
| Ni:(Mo + W) | 0.75 | 0.75 |
| $MoO_3$ (wt %) | 55.7 | 47.2 |
| C (wt %) | 13.3 | 18.4 |
| Oxidic binder (wt %) | 2.6 | 2.5 |
| C:(Mo + W) | 2.9 | 4.7 |
| SA ($m^2/g$) | 11 | <5 |

The bulk catalyst extrudates were sized and sieved to remove extrudates with a length over diameter ratio larger than about 2.5. The sized extrudates were subsequently loaded in a reactor with 10 ml volume. The test unit used for performance testing allowed for the side-by-side testing of different catalysts at identical processing conditions. The catalysts were pre-sulfided using a 2.5 wt % DMDS spiked LGO feed that was fed over the catalyst at a LHSV of 3.0 at 45 bar and with a $H_2$/oil ratio of 300 nl/l. The T program that was used during pre-sulfiding is given in Table 14. The catalytic activity of the catalysts was evaluated at 80 bar pressure, 290° C. and a $H_2$/oil ratio of 500 nl/l in processing an LGO/LCO blend with feed characteristics as presented in Table 15. The catalyst was exposed to the LGO/LCO blend at reaction condition for approximately 8 days.

TABLE 14

Pre-sulfidation T-protocol used for the activation of samples 4-A and 4-B.

|  | Start T (° C.) | End T (° C.) | Time (h) |
|---|---|---|---|
| Step 1 | 25 | 25 | 3.5 |
| Step 2 | 25 | 250 | 22.5 |
| Step 3 | 250 | 250 | 12.0 |
| Step 4 | 250 | 345 | 19.0 |
| Step 5 | 345 | 345 | 12.0 |

TABLE 15

Properties of the LGO/LCO blended feed used for performance testing of samples 4-A and 4-B.

| S-content (ppmwt) | 15977 |
|---|---|
| N-content (ppmwt) | 441 |
| Density at 15° C. (g/ml) | 0.8787 |
| Initial boiling point (° C.) | 74 |
| Boiling point at 50 wt % (° C.) | 277 |
| Boiling point at 90 wt % (° C.) | 352 |
| Boiling point at 95 wt % (° C.) | 370 |

The volume and weight of the bulk catalysts in the different reactors, the space velocity that was applied and the N and S content of the resulting product is given in Table 16. It can be observed that the HDS and HDN activity of bulk catalyst 4-B is significantly higher than that of bulk catalyst 4-B, since lower S and N values are obtained at the same reaction conditions.

TABLE 16

Catalyst intake, LHSV applied and observed conversion for bulk catalysts 4-A and 4-B in a 80 bar test processing a LGO/LCO blend.

|  | Bulk Catalyst 4-A | Bulk Catalyst 4-B |
| --- | --- | --- |
| intake volume (ml) | 10 | 10 |
| intake weight (g, d.b.) | 13.40 | 10.50 |
| Mo loading (mole Mo/l Rx) | 6.0 | 4.7 |
| LHSV ($ml_{feed} * ml_{catalyst}^{-1} * h^{-1}$) | 1.9 | 1.9 |
| S (ppmwt) | 3626 | 2627 |
| N (ppmwt) | 128 | 61 |

After the performance test, the spent catalysts were removed from the reactor and unloaded in white oil. Subsequently, the spent catalysts were washed with toluene using Soxhlet extraction equipment to remove any feed remaining in the catalyst pores. After this treatment, any residual toluene was removed by evaporation. $N_2$ physisorption was carried out on the spent catalysts and the C-content was determined. Results of the analysis on spent catalysts are presented in Table 17.

The spent catalyst analysis illustrates that the carbon content of the catalyst can be reduced during application, as is the case for bulk catalyst 4-B, where the C:(Mo+W) molar ratio has decreased from 4.7 to 2.1. Apparently, some fraction of the organic phase is removed under reaction conditions. This is a surprising finding as in general in hydroprocessing, carbon is deposited on the catalyst in the form of coke and the carbon content of the spent catalyst is higher than that of the fresh catalyst. Moreover, for catalyst 4-B, the SA-BET of the spent catalyst is significantly higher than in the fresh bulk catalyst. However, generally a constant SA, or a decrease in SA is observed due to catalysts deactivation, when comparing the spent catalysts with the fresh catalyst.

TABLE 17

Carbon content and SA-BET of spent bulk catalysts 4-A and 4-B.

|  | Spent Catalyst 4-A | Spent Catalyst 4-B |
| --- | --- | --- |
| C (wt %) | 10.7 | 8.0 |
| C:(Mo + W) | 2.8 | 2.1 |
| SA-BET ($m^2/g$) | 12 | 57 |

The invention claimed is:

1. A NiW, NiMo or NiMoW bulk catalyst precursor composition comprising nickel oxide, and molybdenum oxide or tungsten oxide or mixtures thereof, and an organic component prepared from an organic additive, wherein the total amount of molybdenum oxide and tungsten oxide is at least 30 wt %, the molar ratio of nickel to molybdenum plus tungsten is higher than 0.05, the molar ratio of carbon to molybdenum plus tungsten is between 1.5 and 10; and wherein the organic additive is selected from Acetic acid, Aspartic acid, Citric acid, Formic acid, Fumaric acid, Gluconic acid, Glutamic acid, Glyoxylic acid, Ketoglutaric acid, Maleic acid, Malic acid, Oxaloacetic acid, Propionic acid, Pyruvic acid, Succinic acid, Fructose, Glucose, Lactose, Saccharose, Sorbitol, Xylitol, Serine and mixtures thereof where the bulk catalyst precursor further comprises Ni-crystals detected by transmission electron microscopy technique (TEM).

2. The bulk catalyst precursor of claim 1 further comprising a BET-SA as measured by $N_2$ physisorption of <40 $m^2/g$.

3. The bulk catalyst precursor of claim 1 further comprising a peak at 45° 2theta in a XRD pattern recorded using X-ray radiation with a wavelength of 1.54 Å.

4. The bulk catalyst precursor of claim 1 characterized by the absence of any peaks with a Full Width at Half Maximum in radians (FWHM) of smaller than 2° 2 theta in the range of 10-40° 2theta in its XRD pattern recorded using X-ray radiation with a wavelength of 1.54 Å.

5. The bulk catalyst precursor of claim 1 wherein the molar ratio of carbon to molybdenum plus tungsten is between 1.5 and 7.0.

6. The bulk catalyst precursor of claim 1 further comprising a molar ratio of nickel to molybdenum plus tungsten between 0.10 and 1.05.

7. The bulk catalyst precursor of claim 5 wherein the molar ratio of nickel to molybdenum plus tungsten is between 0.20 and 0.75.

8. The bulk catalyst precursor of claim 1 further comprising an amount of nickel oxide between 2 and 30 wt %.

9. The bulk catalyst precursor of claim 1 wherein the total amount of molybdenum oxide plus tungsten oxide is between 40 and 80 wt %.

10. The bulk catalyst precursor of claim 1 wherein the amount of carbon is between 10 and 30 wt %.

* * * * *